United States Patent [19]

Johnson

[11] 4,057,815
[45] Nov. 8, 1977

[54] ANTI-FLARE STRUCTURE FOR PHOTOGRAPHIC OPTICAL SYSTEM

[75] Inventor: Bruce K. Johnson, Andover, Mass.

[73] Assignee: Polaroid Corporation, Cambridge, Mass.

[21] Appl. No.: 620,924

[22] Filed: Oct. 9, 1975

[51] Int. Cl.² .............................................. G03B 17/02
[52] U.S. Cl. ...................................................... 354/288
[58] Field of Search ................. 354/288, 202, 187, 83, 354/270, 286, 219

[56] References Cited

U.S. PATENT DOCUMENTS

| B 559,111 | 2/1976 | Wolcott | 354/288 |
|---|---|---|---|
| 1,479,112 | 1/1924 | Sparks | 354/202 |
| 2,215,271 | 9/1940 | May | 354/202 |
| 2,238,371 | 4/1941 | Pollock | 354/286 |
| 2,557,297 | 6/1951 | Lea | 354/219 X |
| 2,652,748 | 9/1953 | Croy | 354/270 X |
| 2,665,618 | 1/1954 | Heidecke | 354/288 |
| 3,581,641 | 6/1971 | Nerwin | 354/288 |
| 3,630,130 | 12/1971 | Erlichman | 354/288 |
| 3,759,153 | 9/1973 | Aimo et al. | 354/288 X |

FOREIGN PATENT DOCUMENTS 1,051,702  9/1953  France ................. 354/202

*Primary Examiner*—Donald A. Griffin
*Attorney, Agent, or Firm*—Frank J. Caufield

[57] ABSTRACT

The internal configuration of a rigid opaque exposure chamber structure for use in a reflex photographic optical system is disclosed. The structure is a plastic, injection molded member of unitary construction. Its interior preferably includes an arrangement for receiving a single snap-in side wall having a specularly reflecting surface which, in combination with specularly reflecting side walls of the housing, either direct unwanted radiation from outside the field of view of the system away from its film plane or, alternatively, absorbs it by reducing its intensity through multiple reflections so that the quality of a final photograph will not be impaired. Selected side walls include serrated light traps to enhance the overall performance of the structure in this respect.

23 Claims, 13 Drawing Figures

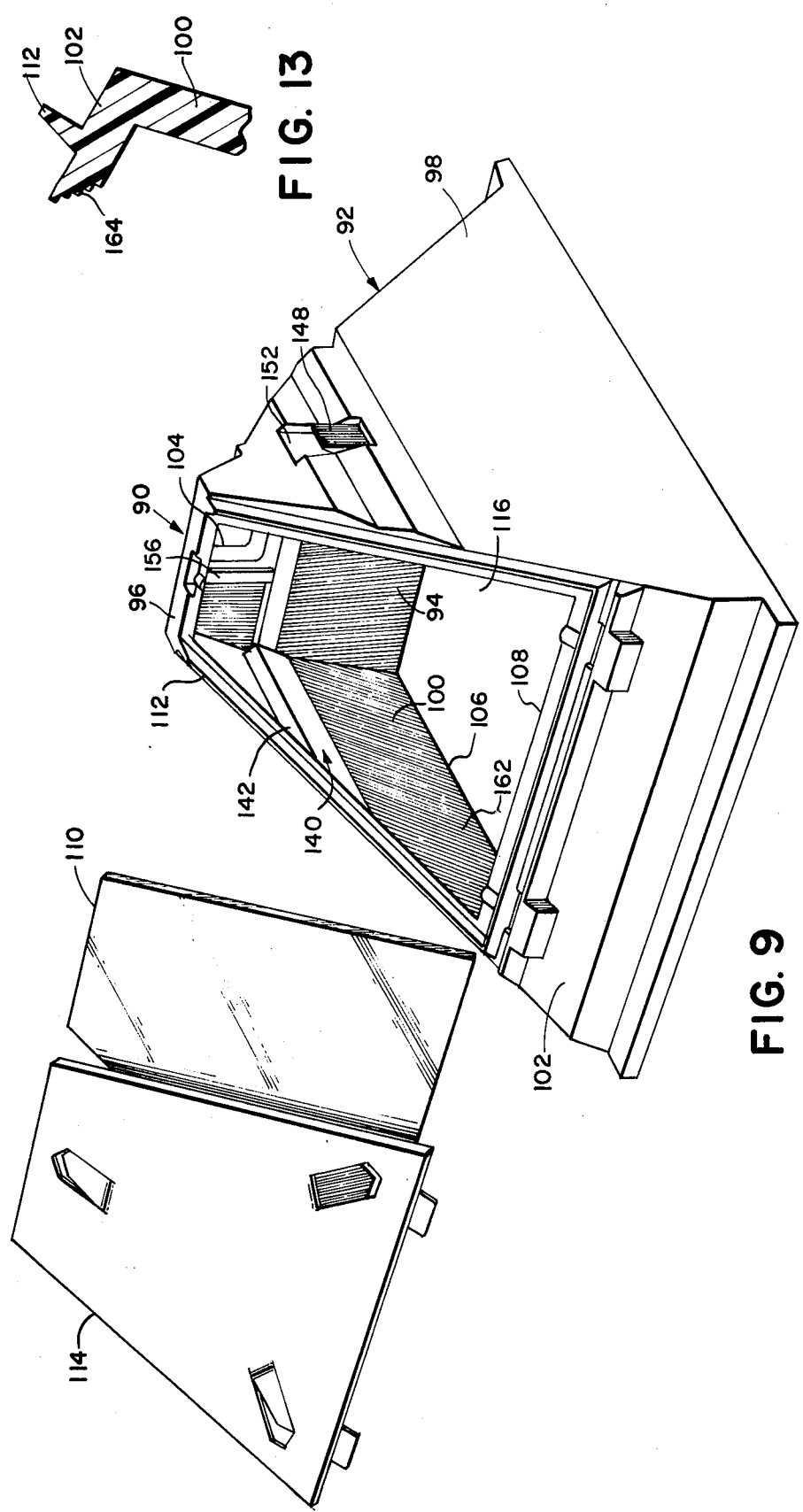

ANTI-FLARE STRUCTURE FOR PHOTOGRAPHIC OPTICAL SYSTEM

BACKGROUND OF THE INVENTION

1. Field of the Invention

This invention relates to photography and, more particularly, to an anti-flare structure for use in a photographic optical system.

2. Description of the Prior Art

In photographic optical systems the objective lens will generally satisfactorily reproduce a larger conjugate object area than is desired to be recorded in the photographic emulsion. Consequently, radiation from outside of the desired field of view of the system can enter the system through the objective lens because the lens "sees" more than is necessary. Once this unwanted radiation enters the system, it can reflect off the system's internal support structure, e.g., camera walls, and eventually reach the photographic emulsion. When this occurs, depending on the nature of the internal reflections, either extraneous images are recorded in the emulsion or an overall fog results causing a reduction in the contrast of the final picture. In either case, the quality of the final picture is seriously degraded if the unwanted radiation is not prevented from reaching the emulsion during exposure.

There are fundamentally two ways of dealing with this problem. The first way is to prevent the unwanted radiation from entering the objective lens by making its field correspond to the field of view of the system. The second is to allow the unwanted radiation to enter the system and then prevent it from reaching the emulsion by absorbing it in the system or by providing an internal baffling arrangement which prevents the emulsion from seeing it. An example of the first is described in U.S. Pat. No. 3,488,103 issued Jan. 6, 1970, and entitled "Anti-Glare Improvement For Optical Imaging Systems". In this patent an external anti-glare baffle having a specularly reflective surface formed from an oblate hemispheroid is described. An aperture in an upper horizontal surface of the hemispheroid is defined by all the foci of the hemispheroid such that rays which enter the baffle through the aperture or through the foci at the edges of the aperture and impinge on the reflective surface are specularly reflected out of the baffle. A viewing aperture is provided at the central portion of the reflective surface for permitting passage of rays emanating from within the desired field of view. Although this arrangement is effective, it would be impractical to use it with a photographic system where size is a limitation. The more conventional solution, especially in photographic systems, e.g. cameras, is to use the second way. Included in the second category are such solutions as lining the interior of the systems with an absorbing material such as flocking, spraying the interior with a highly non-reflective flat black coating of paint, or providing a baffling arrangement. These solutions, too, are satisfactory but have limitations where the size and manufacture of the optical system are overriding concerns. For example, adding flocking material or painting are secondary manufacturing operations. Internal baffling arrangements add size as well as additional manufacturing steps, but can be quite effective, as, for example, their application in Polaroid Corporation's Square Shooter 2 Land Cameras where they are used in combination with specularly reflective light traps running perpendicular to the optical axis of the camera. Therefore, a solution is required which will permit the simplified manufacture of a minimum sized photographic optical system that will effectively deal with unwanted radiation outside its field of view.

SUMMARY OF THE INVENTION

This invention deals with the problem of eliminating the degrading effects that unwanted radiation, outside of the field of view of a photographic system, can have on the quality of the final record contained in a photographic emulsion. The novel features illustrated in the preferred embodiment reside in the internal structural details and spatial configuration of an exposure chamber that forms part of a reflex photographic optical system. In effect, the interior of the chamber is an anti-glare structural arrangement that either directs the unwanted radiation to a location outside of the photosensitive area of the film, absorbs it, or decreases it to an intensity level below the response capability of the emulsion. The exposure chamber is an injection molded member of unitary construction made of an opaque plastic material. The shape of the exposure chamber may be described generally as a frustrum of an irregular quadrangular pyramind. One of the lateral walls of the chamber, a rear wall, is adapted to mount a mirror to reflect rays coming from an objective lens, mounted in a front wall, to the film plane which is formed in the base. The interior surfaces of the chamber are all smooth, specularly reflective, surfaces as opposed to having a rough matte finish. The smooth interior finish is achieved by polishing the mold used to fabricate the chamber. The reflection characteristics of the smooth surfaces vary as a function of the angle of incident radiation; the smaller the incident angle, the lower the reflected radiation. The chamber is divided into upper and lower sections by the addition of a single snap-in side wall baffle having specularly reflecting surfaces located approximately midway between the base and a top wall. In the upper section the angles of the side walls are carefully selected to direct a portion of the fan of unwanted rays through a multiple bounce path so that, at each bounce, these rays experience an approximate intensity loss of three stops compared with their initial intensity. Therefore, by the time they reach the photosensitive emulsion, their radiation intensity is insufficient to expose the emulsion. Another portion of the unwanted rays is directly blocked by the snap-in baffle. The remaining rays are allowed to reflect off the lower side wall whose angles are chosen to direct them to a location outside of the photosensitive area of the emulsion. In addition, the side walls of the lower section and the front wall of the upper section are provided with a plurality of internally molded serrations that are designed to act as radiation traps to further reduce the intensity of incident radiation by absorption. The exposure chamber as a result of its interior configuration occupies a minimum space closely approximating that of the bundle of the desired fan of rays within the system's field of view.

Accordingly, it is an object of the invention to provide a minimum sized anti-flare structure for use in a photographic optical system.

Another object of the invention is to provide an anti-flare structure for simplified manufacture.

BRIEF DESCRIPTION OF THE DRAWINGS

The novel features that are considered characteristic of the invention are set forth in the appended claims. The invention itself, however, both as to its organization and its method of operation, together with additional objects and advantages thereof, will best be understood from the following description when read in connection with the accompanying drawings wherein like numbers have been employed in the different figures to denote the same parts and wherein:

FIG. 9 is a diagrammatic exploded perspective of the exposure chamber of the preferred embodiment;

FIG. 13 is a segmented cross-sectional view taken along line 13—13 in FIG. 10;

INTRODUCTION

Figure 1:
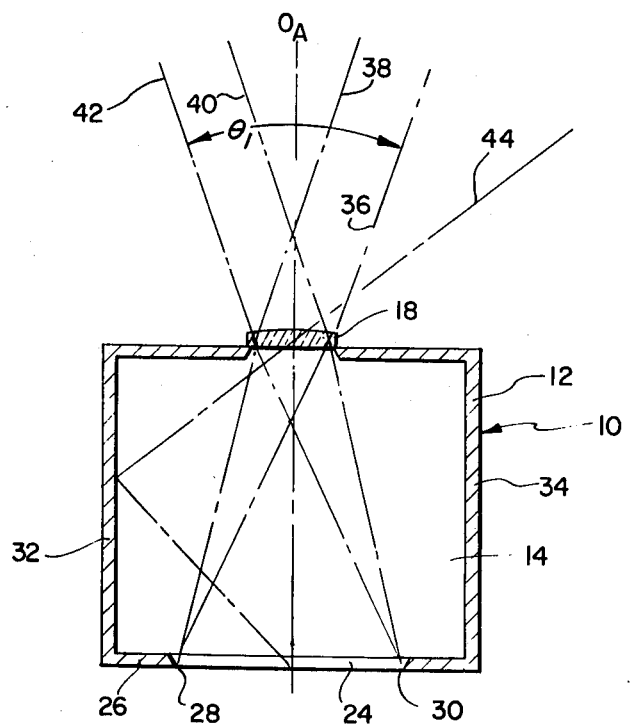
FIG. 1 is a cross-sectional elevational view of a simple, unfolded box-type optical system used to illustrate certain concepts related to the invention.

One of the major sources of poor quality photographs is the presence of "flare" light or unwanted radiation in images formed by photographic optical systems. Although flare has many sources, the present invention is concerned primarily with improving image quality by eliminating the effects of unwanted radiation that enters the optical system and has its origins outside the field of view of the optical system, but within the field of an objective lens that forms part of the system. The flare problem arises because photographic objectives will generally satisfactorily image a larger conjugate object area than is required to record the picture. Consequently, radiation from outside of the desired field of view of the system can be reflected off interior surfaces and eventually reach the photosensitive area of the film, that defines the limits of the picture. When this occurs, depending on the nature of the internal reflections, either extraneous or ghost images result or fogging occurs causing an overall reduction in the contrast of the final photograph.

In addition to providing a solution to the basic problem of "flare", the present invention is also concerned with the size and ease of manufacture of the structure that provides the basic solution. The two requirements, anti-flare and minimum size are somewhat mutually exclusive since the qualities which normally make a good anti-flare structure are generally inconsistent with small, simple structures that can be easily manufactured.

The novel features illustrated in the preferred embodiment of this invention reside in the internal structural detail and spatial configuration of an exposure chamber that forms part of a reflex photographic optical system. In effect, the interior of the chamber is an anti-flare structural arrangement that intercepts unwanted radiation and either directs the unwanted radiation to a location outside of the photosensitive area of the film, absorbs it, or decreases it to an intensity level below the response capability of the film prior to its impinging on it.

The peculiar characteristic of this invention which makes it work and distinguishes it from conventional approaches is a series of specularly reflective surfaces located on the interior of the exposure chamber. These specularly reflective surfaces represent a design anomaly considering the nature of the basic problem—the elimination of internal reflections. However, there is an explanation for this deviation from convention. It has its foundation in the following principle. If the designer carefully locates the path of all rays, both wanted and unwanted, entering the optical system through the objective lens, he can provide specularly reflective surfaces which intercept the identified unwanted rays and, by reflecting them, control their terminal point within the system. This is the crux of the invention. To understand its application in the preferred embodiment, the general design process will first be discussed by considering a simple straight through (unfolded) optical system and then explaining how the concepts involved in the general process relate to the preferred embodiment.

THE PROBLEM ILLUSTRATED

Consider the simple box-type optical system 10 illustrated in cross-section in FIG. 1. The system 10 includes a box-like housing 12 constructed of some suitable opaque material. The interior of the housing 10 defines an exposure chamber 14. On a forward wall 16 is mounted an objective positive lens 18. The lens 18 is mounted in alignment with an aperture 20 that permits light to enter the chamber 14. Opposite the forward wall 16 is a rear wall 22 having an exposure aperture 24 that permits light to leave the chamber 14. The spacing between the walls 16 and 22 is selected so that light entering the system 10 will be properly focused in a plane coincident with the exterior surface 26 of the rear wall 2. A pair of spaced apart edges 28 and 30 define the format of a film to be used with the system 10. It can be assumed that between the edges 28 and 30, the image quality is best, and that all cross-sections would be geometrically similar. To complete the description of the system 10, there are a pair of side walls, 32 and 34, that connect the front and rear walls, 16 and 22. It can be assumed that the side walls, 32 and 34, have strong specularly reflective surfaces.

Figure 2:
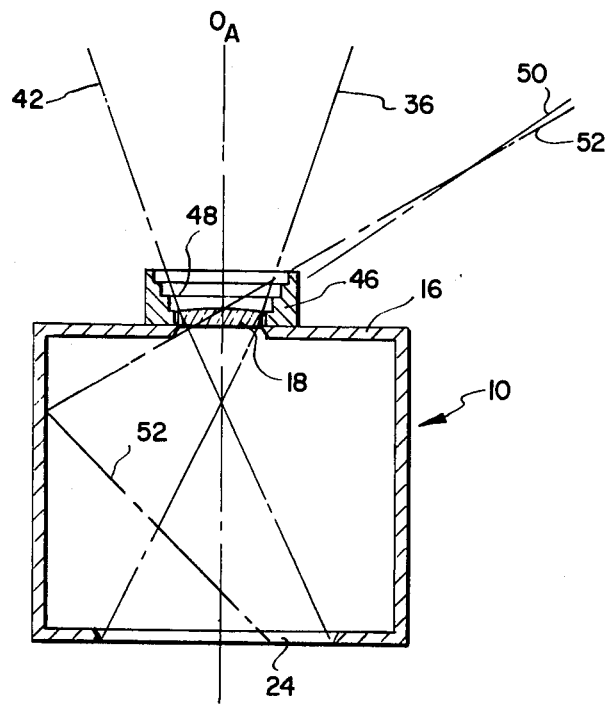
FIG. 2 is a cross-sectional view of the system of FIG. 1 including an objective lens bezel and is included to amplify on the inventive concepts.
Figure 3:
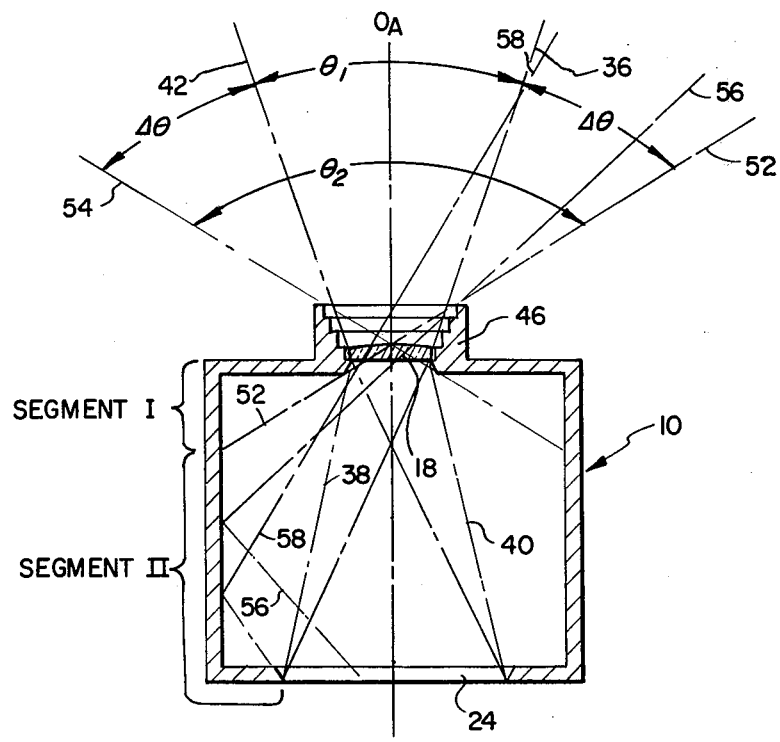
FIG. 3 is structurally identical to FIG. 2 but includes additional ray tracing information used to further illustrate concepts related to the invention.

Having completed the description, the optical characteristics of the system 10 will now be examined. The first step is to establish its field of view, or to put it another way, determine what area in object space will be imaged within the exposure aperture 24. Since an extended object may be regarded as an array of point sources, the location and size of the image formed can be determined by locating the respective images of the sources making up the object. This can be accomplished by calculating the paths of a number of rays from each object point through the optical system and applying Snell's Law at each ray-surface intersection is turn. Because there is a one-to-one relationship between object and image points, the process may obviously be reversed by projecting rays out of the system to determine the conjugate object area. Since the extremes are of interest, a fan of rays originating at the edges of the format, 28 and 30, are traced. It can be seen that a ray 36 and a ray 38 represent the extreme rays that will get out of the system 10 from the edge 28. Because symmetry applies, the extreme rays from the edge 30 are simply designated as rays 40 and 42. The angle subtended by the intersection of the rays 36 and 42, call it $\theta_1$, is a measure of the field of view of the system 10 and is called its field angle. Any rays that enter the system 10 and are outside of the field angle are unwanted radiation. A ray such as that designated as 44 would therefore be unwanted. Ray 44 can enter the system because the objective lens 18 is capable of imaging light outside the field of view of the system 10. Its effects are obvious. It first reflects off side wall 32 and reaches the exposure aperture 24 where is would create an extraneous image. This particular system poses serious flare problems because the field of the lens 18 is very close to 180°. In other words, it will transmit radiation from almost anything in front of it. There is one immediate and relatively simple way to alleviate this problem. The designer can limit the field of the lens with a lens shade or bezel that surrounds the lens and prevents some of the unwanted radiation from entering the system. FIG. 2 shows a bezel 46 extending from the forward wall 16 and in alignment with the objective lens 18. Notice a series of steps 48, the corners of which just touch the extreme rays, 36 and 42, which define the system field of view. If ray tracing is now used to determine what rays will enter the system 10, it's obvious that there are a class of rays such as that designated as 50 which the lens 18 cannot "see". Through an orderly ray tracing procedure, an extreme ray 52 is found which just enters the system 10. However, the ray 52 is still a problem since its reflected component has also reached the exposure aperture 24. Nevertheless, a significant reduction in the field of the lens 18 has been effected. It has gone from almost 180° to a substantially smaller field angle as illustrated in FIG. 3. The field of the lens 18 in combination with the bezel 46 is designated as $\theta_2$ in FIG. 3 and is the angle subtended by the intersection of the extreme ray 52 and its symmetric counterpart, a ray 54. The designer is now in a position where he can begin to identify families of rays that fall within the category of unwanted radiation. The first, and most obvious family, includes all those rays that originate from within the angular segment formed by the intersection of the ray 36 and the ray 52. Likewise, between the ray 42 and the ray 54. For convenience, this angular segment is designated as $\Delta\theta$ in FIG. 3. A typical ray in this family is designated as the ray 56 in FIG. 3. Another family of rays has its origin outside of the field of view, $\theta_1$, of the system 10. A ray from this family is typified by a ray 58 in FIG. 3. The ray 58 is also characteristic of those rays having their origin outside the field of view of the system 10. Unwanted radiation, then, based on this analysis includes any ray entering the exposure chamber 14 from the field of the lens but outside of the field of view of the system and does not go directly to the exposure aperture 24. Having defined what is meant by unwanted radiation, it can be seen that there are segments of the side walls, 32 and 34, and the rear wall 22, where unwanted radiation strkes and, upon reflection, eventually would reach the photosensitive area of a film disposed within the exposure aperture 24. For convenience, these wall segments are bracketed and identified in FIG. 3. In Segment I, no radiation strikes. Segment II, however, receives all unwanted radiation. The question now is how to prevent the unwanted radiation from reaching the exposure aperture 34.

There are a variety of possibilities. Some of these will be discussed keeping in mind, however, the additional restrictions that the system must be of minimum size and must also be simple to manufacture. One approach, for example could be to roughen the surface of wall segment II in order to diffuse the unwanted radiation so it would not be image bearing. The roughened surface would have the effect of randomly scattering the unwanted radiation throughout the exposure chamber 14 thereby increasing the overall illumination level in the inside of the exposure chamber 14. This is obviously undesirable since this increase in illumination would reduce picture contrast. Another approach would be to spray the interior of the exposure chamber 14 with a dull, flat black paint. This suffers from two disadvantages. It would require a secondary operation and, as well, would not totally prevent specular reflections since even a dull surface specularly reflects some light when the incident angle of the radiation approaches the grazing angle. It would also include some diffuse light whose effects were previously discussed. Still another approach would be to line the interior of the chamber 14 with a light absorbant flocking material. This approach would produce good results but would complicate manufacture. The most conventional approach would be to erect baffles extending perpendicularly from the side walls toward the system's optical axis. This approach also would be quite effective. However, it does not reduce size and, in addition, would unduly complicate manufacture especially if the housing 12 were to be fabricated by plastic injection molding techniques. The mold, in this latter case, would necessarily have to be rather complicated in order to fabricate the perpendicularly extending baffles needed to achieve the desired result. Furthermore, if the side walls, 32 and 34, were moved toward the optical axis in order to reduce size, the number of baffles required would begin to increase geometrically. Obviously, this approach is inconsistent with the design goals.

PRINCIPLE OF OPERATION ILLUSTRATED IN NON-FOLDED EMBODIMENT

As mentioned earlier, the present invention is based on the principle that specularly reflective surfaces can be selectively placed in positions where they intercept unwanted radiation and ultimately control the disposition of the unwanted rays. This principle will now be discussed in terms of its application to the system 10.

First of all, the absolute minimum size that the system 10 could be reduced to would occur when the size walls 32 and 34, were made to exactly coincide with the rays, 38 and 40. It is apparent that specularly reflective surfaces so positioned would not work because all the unwanted radiation would ultimately reach the exposure aperture 24. By slightly backing away from this boundary and selecting angles for side walls oblique to the optical axis, it is possible to provide a plurality of specularly reflective surfaces that will do the job.

Figure 4:
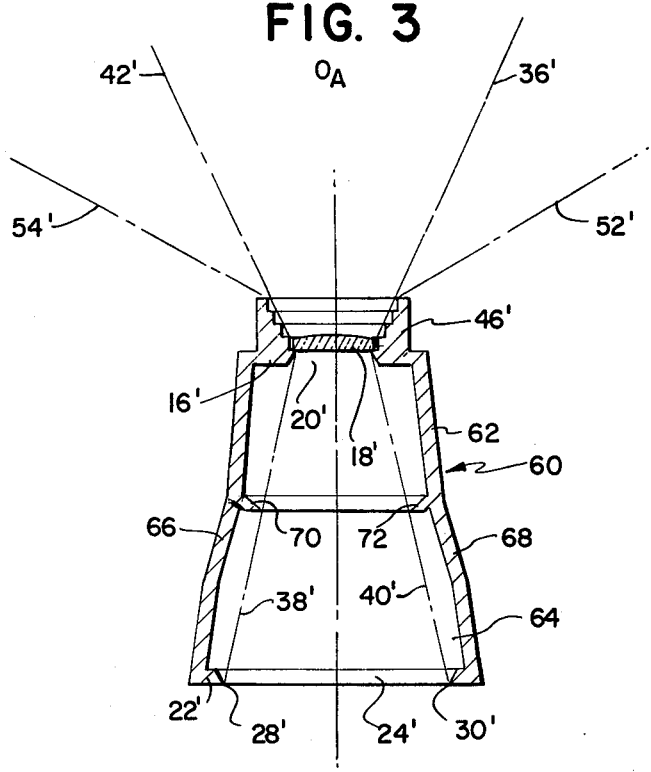
FIG. 4 is a cross-sectional elevational view of an unfolded optical system having certain optical characteristics identical to the system of FIG. 2 but including structure illustrative of an embodiment of the invention.

Such a system is illustrated in FIG. 4 where it is designated as 60. The system 60 and the system 10 are exactly the same with an apparent exception; housing 12 of the system 10 is much different than the structure of the system 60 designated as 62. Otherwise, the system 60 includes the same objective lens, 18', the same bezel, 46', the same entrance aperture, 20', and the same exposure aperture, 24'. The rays defining the field of view of the system 60 and the field of the objective lens 18' in combination with the bezel 46 are identical to those of the system 10. In other words, the unwanted radiation that entered the system 10 is identical with that entering the system 60. The exposure chamber of the system 60 is designated as 64.

The differences between the two systems exist in the structure 62. The structure 62 includes a pair of side walls, 66 and 68, the interior surfaces of which form oblique angles with respect to the optical axis of the system 60 and run generally lengthwise of the extreme rays 38' and 40' which define the field of view of the system 60. In the middle of the exposure chamber 64 are a pair of reflecting surfaces, 70 and 72, which extend inwardly from the side walls, 66 and 68. The edges of surfaces 70 and 72 terminate where they would just intersect the extreme rays 38' and 40' which define the limits of the bundle of rays that are contained in the field of view of the system 60 and are directly imaged in the exposure aperture 24'. The surfaces 70 and 72 also form oblique angles with respect to the optical axis. The position of the side walls, 66 and 68, closely hugging the rays 38' and 40', determine the size of the housing 62. In the direction of light traveling through the system 60, the side walls form a diverging type chamber which, assuming the surfaces 70 and 72 were not present, readily facilitates a simplified molding for fabrication purposes. This could be accomplished if the surfaces, 70 and 72, were contained in a separately molded piece that snaps into the side walls at the appropriate location. As will be seen later, the preferred embodiment does exactly this.

Figure 5:
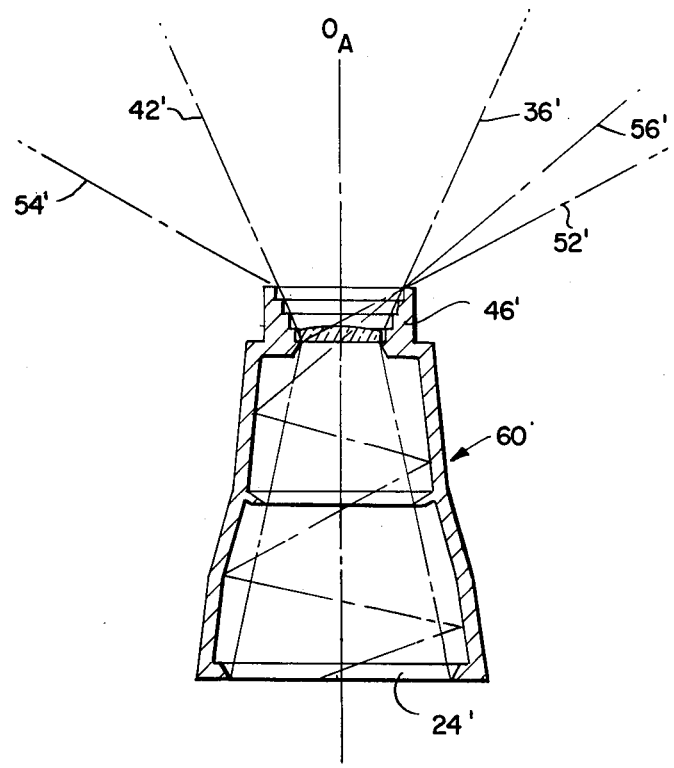
FIG. 5 is structurally identical to FIG. 4 but includes additional ray tracing information used to illustrate how the invention operates.
Figure 6:
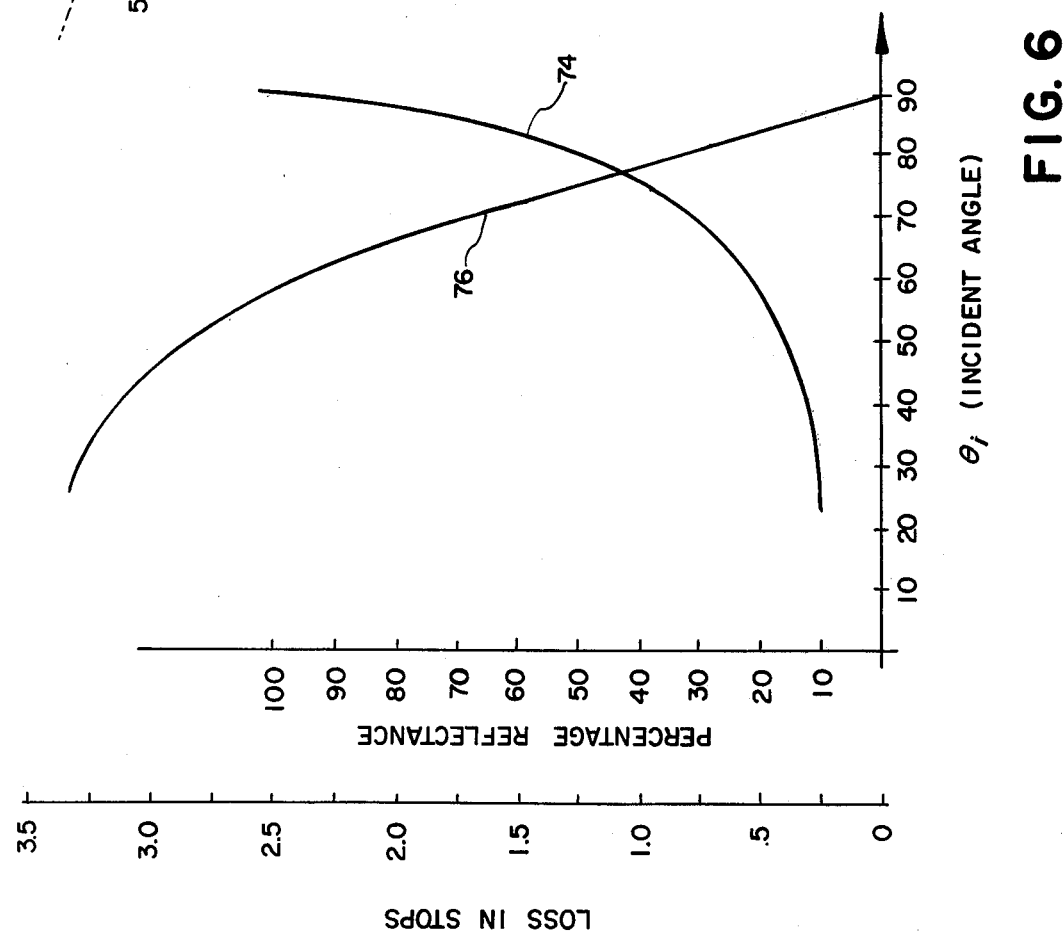
FIG. 6 is a graph showing the specular reflection characteristics of a plastic material used in fabricating the preferred embodiment.
Figure 12:
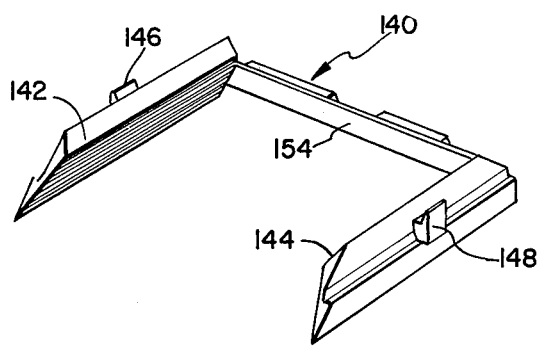
FIG. 12 is a diagrammatic perspective of a snap-in specularly reflective surface member for use in the exposure chamber of FIG. 9.

Assuming all the interior surfaces of the exposure chamber 64 to be specularly reflective, the disposition of unwanted radiation can be analyzed by again using ray tracing techniques. The rays to be considered will be those typical rays previously identified as belonging to certain families of unwanted radiation except will now be designated as primed (') numbers. For example, referring to FIG. 5, the ray 56' (from the $\Delta\theta$ segment) is now sent through a multiple bounce path prior to its intersecting the exposure aperture 24'. This at first seems no better than the system 10. However, each time the ray 56' reflects off a surface its intensity can be reduced by selecting a material that is a good absorber so that the intensity of the surface reflection is a low percentage of the incident value. In addition, the surface should not scatter incident radiation in a random fashion, but rather in accordance with Snell's law of reflection. These are the keys to the invention. The surface must be specularly reflective to control the ray path but should also have relatively low reflectivity and scattering properties. The perfect material and surface combination would obviously be one whose characteristics approached that of a perfect absorber, relecting no radiation. Since most thermoplastic materials suitable for making structures of this general type are not perfect absorbers, it is necessary to use one whose absorbtivity characteristics are sufficient to attenuate reflected radiation by being able to direct it through an appropriate bounce path in a predictable manner. An example of a suitable material having adequate characteristics, and used in the preferred embodiment with excellent results, is an Acrylonitrile/Buteidiene/Styrene synthetic polymeric (ABS) having an average surface finish of 4–10 microinches and blackened with carbon. The surface finish, which is equivalent to a No. 2 finish according to the Mold Finish Comparison Kit of the Society of Plastics Industry and Engineering, gives the material properties and the carbon makes it a good absorber of incident radiation. FIG. 6 shows a set of curves describing the specular reflection characteristics of the ABS used. It will be noted the reflectivity is direction sensitive; a property apparently related to the molecular structure of the surface and the fact that the ABS is a dielectric. This direction sensitivity, however, will not affect the operation of the invention unless a large percentage of the unwanted radiation is allowed to strike the polished surfaces at low incident angles and then reflected directly into the film. It will be seen that this is not permitted to occur in the present invention because of the positioning of the surfaces. In addition, the ABS with the No. 2 finish is an apparently good non-scattering surface since it is capable of forming sharp images of reflected objects. Curve 74 show the percentage reflectance as a function of incident angle and curve 76 shows the change in intensity in stops when calculated using the expression $$\left( S = \text{LOG}_2 \frac{\text{Reflected Radiation}}{\text{Incident Radiation}} \right).$$

Figure 7:
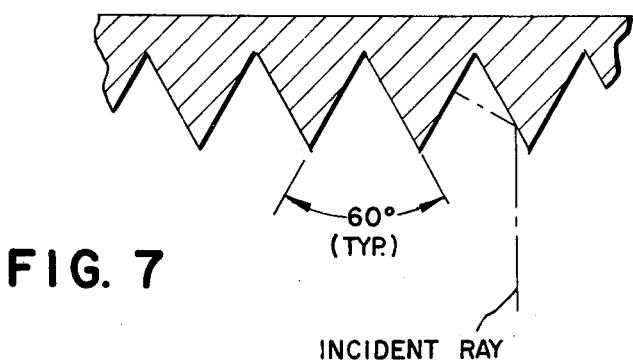
FIG. 7 is a shematic representation of a serrated surface used in the preferred embodiment.

What the graph in FIG. 6 illustrates is that incident radiation between 20° and 70° will experience a mean loss of approximately 2.5 stops per bounce. For the ray 56' shown in FIG. 5, the loss would be loss would be 10 stops since it undergoes four bounces. This is well outside the response range of most multicolor or black and white reversal films. In order to insure that this order of magnitude in intensity loss always occurs for rays like the ray 56', an additional feature which is employed in the preferred embodiment to enhance its performance will be discussed presently to demonstrate how it operates. However, it is understood that this feature is not absolutely essential. All of the reflecting surfaces of the exposure chamber 64, below the surfaces 70 and 72, may be provided with a plurality of serrations (see FIG. 7) whose major dimension, the length of the groove, forms the same oblique angle with the optical axis as the surface it is placed on. The angle of the grooves in the serrations must be less than 90°, and as FIG. 7 indicates, the preferred embodiment uses 60°, When a ray of light enters the serrations it is reflected a plurality of times until it is eventually absorbed as shown in FIG. 7.

Therefore, not only is a ray, like the ray 56', sent through a multiple bounce path before entering the exposure aperture 24', but it has a high probability of never reaching it as a result of the serrations in the lower part of the exposure chamber 64.

Figure 8:
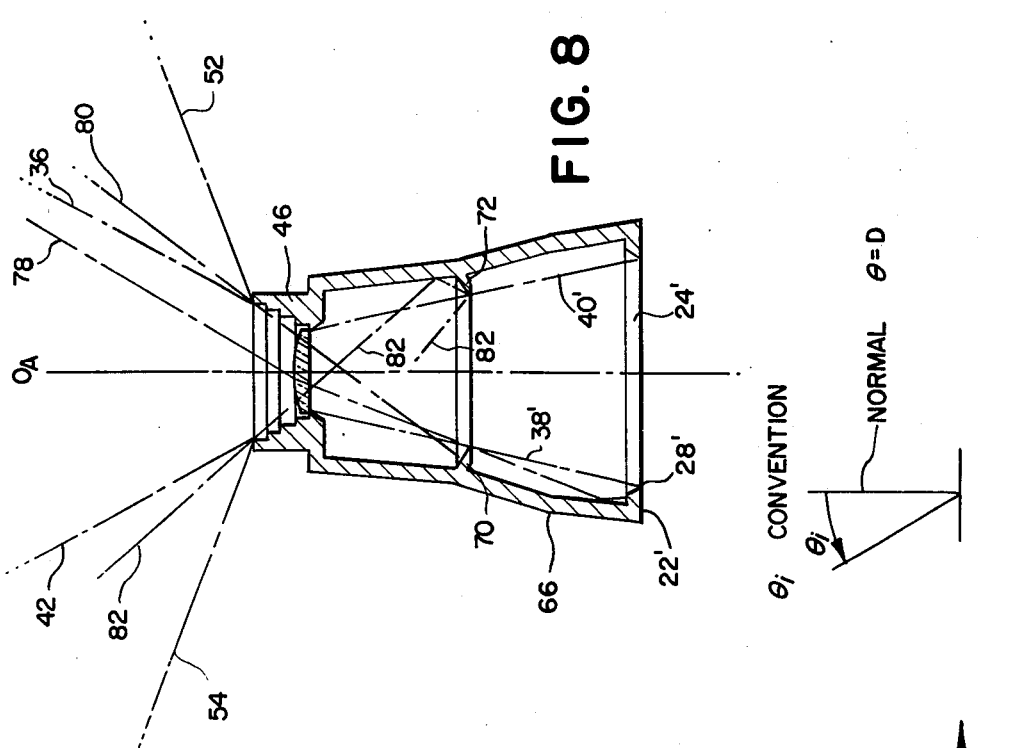
FIG. 8 is structurally identical to FIG. 5 and further includes additional information relating to the operation of the preferred embodiment.

Consider another ray 78 that enters the system 60. Refer to FIG. 8 to trace its path. The path of the ray 78 is directly to the lower part of the chamber 64 where it is reflected into the area between the edge 28' of the exposure aperture 24' and the intersection of the side wall 66 with the rear wall 22'. All rays characterized by shallow angle intersections with either extreme rays 38' or 40', will directly hit the lower side wall and be directed to a location outside of the exposure aperture 24'. This is possible because the serrations do not run transverse to the direction of travel of these rays. There are many rays like the ray 80 (See FIG. 8) that are directly blocked by either the surface 70 or 72. Other rays typified by a ray 82 in FIG. 8 experience multiple bounces in the upper part of the chamber 64 prior to reaching exposure aperture 24' by being bounced off the surfaces, 70 and 72.

To summarize, the unwanted radiation is intercepted by specularly reflective surfaces with low reflectivity and is either directed through a multiple bounce path losing intensity at each bounce, is absorbed by serrations in selected surfaces, or is directed to a location outside of the exposure aperture. The design process involved determining the field of view of the system and the field of the lens as modified by the bezel, identifying unwanted radiation, and positioning specularly reflective surfaces at oblique angles to the system optical axis to intercept the unwanted radiation. The location of the surfaces were empirically determined using ray tracing techniques.

DESCRIPTION OF THE PREFERRED EMBODIMENT

Although the preferred embodiment is an exposure chamber for use in a reflex photographic optical system, its principle of operation, the design process, and the problems it deals with have all previously been discussed. Its novel features are identical to those discussed with reference to the system 60 of FIG. 4. The single significant structural difference between the preferred embodiment and the system 60 is the inclusion of a mirror on a rear wall of the exposure chamber of the preferred embodiment. The mirror is used to fold the optical path in a system using the preferred embodiment. However, this structural difference in no way invalidates the principle of operation or design process when applied to the preferred embodiment. It is a difference in form between the preferred embodiment and the system 60 and not in substance. Therefore, the particular structural details of the preferred embodiment will be discussed with only as much reference to its detailed construction as is necessary to clarify its operation.

The preferred embodiment of the invention is illustrated in FIG. 9 as the exposure chamber designated as 90. The chamber 90 comprises an injection molded structural member 92. The member 92 is of unitary construction fabricated of an opaque plastic material (ABS), preferably black in color. The member 92 is formed of five wall sections including a front wall section 94, a top wall section 96, a pair of side wall sections, 98 and 100, and a rear wall section 102. The front wall section includes an inlet aperture 104. The bottom edges of the front wall sections 94, the side wall sections, 98 and 100, and the rear wall section 102 cooperate to define an exposure or outlet aperture 106. Integrally formed in the rear wall 102 is a trapezoidal shaped aperture 108 over which a mirror 110 is placed. Surrounding the perimeter of the aperture 108 on three sides is an outwardly extending flange 112 that is designed to cradle the mirror 110 and align it with the aperture 108. After the mirror 110 is placed over the aperture 108, it is retained in that position by a mirror retainer 114 that releasably engages with complimentary configured portions of the rear wall 102. In addition to retaining the mirror in position, the retainer 114 in cooperation with the outwardly extending flange 112 forms a labyrinth type light seal that prevents ambient radiation from passing through the aperture 108. Further details of this mirror mounting arrangement are disclosed in U.S. application Ser. No. 574,026, filed May 2, 1975. One important aspect, however, that is pointed out here is the fact that the edges of the aperture 108 define the limits of the effective reflecting area of the mirror 110.

Figure 10:
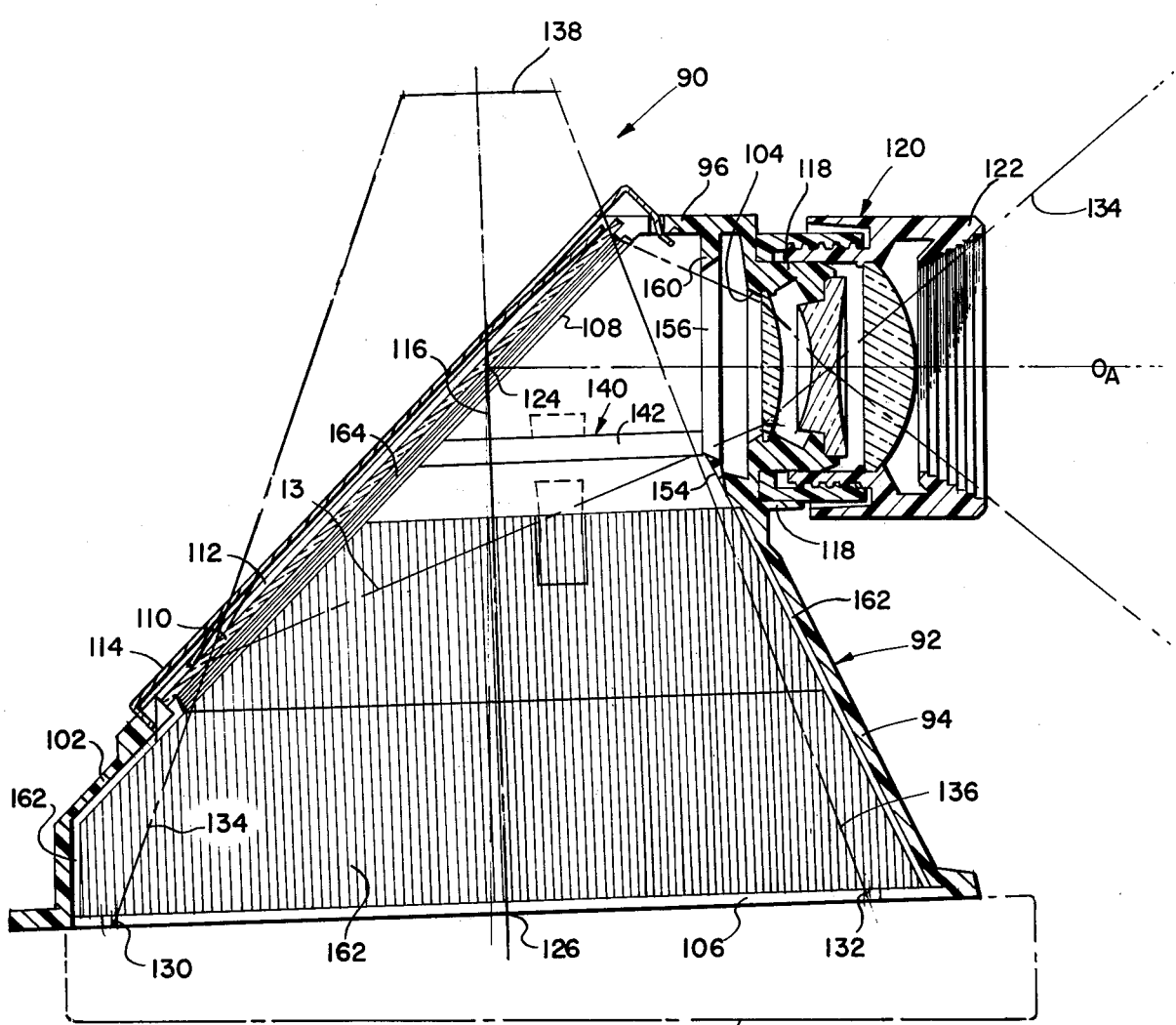
FIG. 10 is a cross-sectional side elevational view of the exposure chamber of FIG. 9 including an objective lens assembly.

With the mirror 110 retained in place on the rear wall section 102, it is clear that the mirror 110 and said wall sections that form the structural member 92 cooperate to define a light tight enclosure identified as 116 in both Figs. 9 and 10.

Referring to FIG. 10, it can be seen that the exterior of the front wall section 94 includes an outwardly extending flange 118 which surrounds the inlet aperture 104. The function of the flange 118 is to provide a means for mounting an objective lens assembly 120 including a bezel 122. The objective lens assembly 120 shown here is a Cooke Triplet type, but any lens suitable for photographic work may be adapted for use with the present invention, or alternatively, the present invention may be adapted for use with different photographic lenses. The lens assembly 120 has been included in FIG. 10 to illustrate how such a lens may be mounted to the structural member 92 and, in addition, to aide in explaining the invention. It should be noted that such lens assemblies need not be directly mounted to the flange 118. An alternative mounting scheme could optically couple the lens assembly 120 to the structural member 92 by first mounting the lens assembly 120 to a shutter or lens board and then mounting that assembly to the flange 118.

Figure 11:
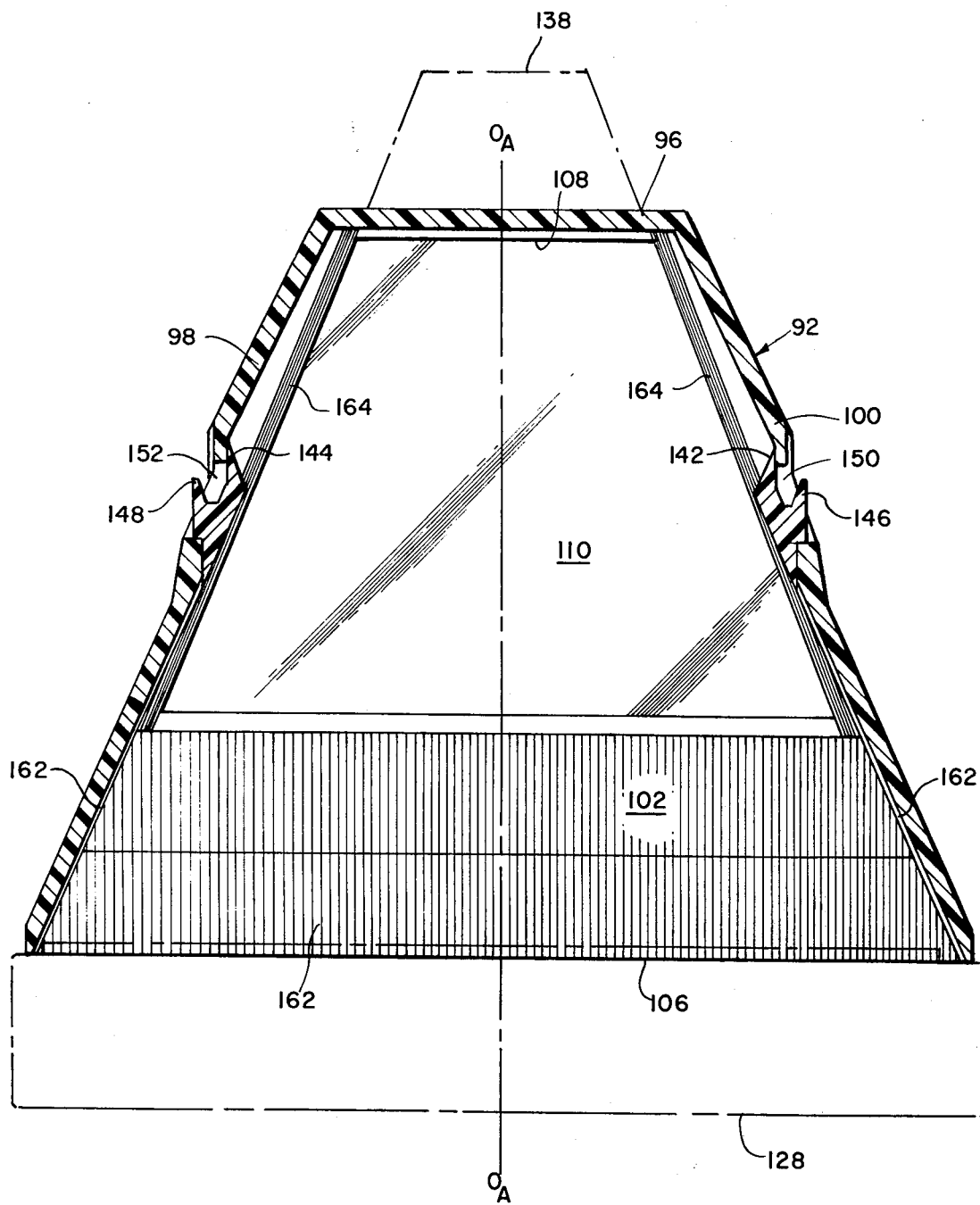
FIG. 11 is a cross-section front elevational view of the exposure chamber of FIG. 9.

The optical path of radiation entering the exposure chamber 90 can be seen in FIG. 10. Radiation passes through the objective lens assembly 120 and enters the enclosure 116 through the inlet aperture 104. From there it strikes the mirror 110 where, by reflection, it is directed toward the exposure aperture 106. For example, an axial ray coincident with the optical axis strikes the mirror at a point 124 and subsequently intersects the exposure aperture 106 at a point 126 which corresponds to the center of the area of the exposure aperture 106. The field of view of the system, i.e., the exposure chamber 90 in combination with the objective lens assembly 120, can be determined by using the ray tracing method previously discussed in connection with the system 60. This system, however, unlike the system 60 does not have what corresponds to a masking aperture which defines an area in the exposure aperture 106 that would be the same size as the photosensitive area of a film used with the system. Rather, it is contemplated that the invention would be used with a film cassette that performs this function. Namely, a cassette such as that described in detail in U.S. Pat. 3,779,770 is of the type intended for use with this invention. The important relevant feature of this type cassette, at least for the present purposes, is that it includes a front wall section that has a masking aperture that limits the exposure area of the film. To illustrate this, such a cassette is shown in phantom in FIG. 10 where it is designated as 128. There the cassette 128 is shown disposed within the exposure aperture 106 in readiness to receive radiation. The limits of the exposure area defined by the aperture in the cassette 128 are shown as its edges 130 and 132. It is from these two points that rays are projected back out of the system to determine the system field of view. The extreme rays which define the system field of view are shown as rays 134 and 136. Unwanted radiation outside the field of view can be determined as before. Having identified the unwanted radiation, the procedure for determining the angles of the wall sections and reflecting surfaces intended to intercept it would proceed as previously discussed. An alternative analysis could be used, though. This would involve replacing the lens assembly 120 by a diffuse disk source whose size and location corresponds to the exit pupil of the lens assembly 120. It could then be assumed that the source radiated in all directions within the limits set by the extreme rays defining the field of the lens assembly. Once this had been done, a virtual image of the source can be used to replace the lens assembly. This is shown in FIG. 10. By continuing the projection of the rays 134 and 136 through the mirror 110 and measuring off the distance from point 124, along the optical axis, to the exit pupil of the lens assembly 120, the location of an equivalent disk source above the exposure aperture 106 can be determined. Such a source is indicated as 138. This procedure would convert the analysis to the unfolded equivalent system and the design procedure would follow as before. In particular, note the similarity between the system 60 in FIG. 4 and the preferred embodiment shown in FIG. 11. The only difference between the two that would have to be accounted for is the fact that rays emanating from the source 138 would not go directly to the exposure aperture 106 unless they fell within the aperture 108.

The internal features of the exposure chamber 90 will now be taken up. Referring to FIG. 10, there is seen a member 140 that approximately bisects the enclosure 116 into the upper and lower portions. The member 140 includes a pair of reflective surfaces 142 and 144 which form an oblique angle with respect to the optical axis of the system (See FIG. 11). The member 140 is a plastic insert that releasably snaps into engagement with complimentary configured portions of the side walls 98 and 100. In this connection, the member 140 has a pair of spaced apart vertical tabs, 146 and 148, that fit into a corresponding pair of spaced apart recesses, 150 and 152, molded into the side walls, 98 and 100. A front section 154 of the member 140, in cooperation with a pair of vertically extending ribs, only one of which is shown, 156, and a horizontal rib 160 form a rectangular baffle located behind the inlet aperture 104 (see FIGS. 9 and 10). Since these ribs run from the top wall section 96 toward the exposure aperture 106 they do not present a molding problem and, as well, aid in further limiting the quantity of unwanted radiation that can internally reflect from the various surfaces within the enclosure 116. Below the member 140 all of the walls include on their surfaces serrations similar to those previously described and whose cross-sections were illustrated in FIG. 7. These are designated as 162 in FIGS. 9, 10 and 11 and function as described previously. In addition, these serrations are included above the member 140 on the interior of the front wall 94 to minimize problems from radiation reflected from the mirror onto that surface. Notice again from FIG. 11 that the angles of the side walls, 98 and 100, and the surfaces, 142 and 144, are all oblique to the system optical axis. More-over, all of these surfaces, including the serrations, are all specularly reflective. The lateral edges of the aperture 108 include a series of steps 164 that function to reduce extraneous reflections off the mirror 110. These steps are shown in FIG. 13 which is a section taken along line 13—13 of FIG. 10.

The nature of the preferred embodiment shown is somewhat more complex than the unfolded system 60 used to explain its operation. But that complexity, the folding of the optical path by a mirror, is simply a matter of degree and does not alter the underlying principles of the invention. Whether the system is folded or not, the concept of applying to the interior of an exposure chamber a series of specularly reflective surfaces to intercept unwanted radiation to control its final disposition remains valid. The particular choice of the location of these surfaces and their angles will of course depend on the specific details of each optical system.

This invention may be practiced or embodied in still other ways without departing from its spirit or essential character. The embodiment described herein is therefore illustrative and not restrictive, the scope of the invention being indicated in the appended claims and all variations which come within the meaning of the claims are intended to be embraced thereby.

What is claimed is:

1. Photographic apparatus comprising:
    means for defining an image plane at which a film unit having a photosensitive area of given dimensions may be positioned for exposure;
    an objective lens assembly, having a given field in object space, for directing image-bearing light rays from a scene being photographed onto the entire photosensitive area of the film unit when the film unit is positioned at said image plane to record an image of the scene thereon, said objective lens assembly and the photosensitive area of the film cooperating to define a field of view of said photographic apparatus which is smaller than said field of said objective lens assembly; and
    an opaque enclosure structure having an outlet aperture disposed in optical alignment with the film unit's photosensitive area and an inlet aperture in optical communication with said objective lens assembly, said objective lens assembly being configured and arranged with repsect to said opaque enclosure structures so that unwanted image-bearing light rays originating within said field of said objective lens assembly but outside said field of view of said photographic apparatus enter said enclosure structure through its said inlet aperture, said enclosure structure comprising internal light-absorbing specularly reflective wall surfaces including portions located and oriented to initially intercept substantially all such unwanted image-bearing light rays and to redirect initial reflections of substantially all such unwanted image-bearing light rays in predetermined directions so that they either do not impinge upon the photosensitive area of the film unit or only impinge upon the photosensitive area of the film unit after undergoing a plurality of additional reflections from said internal wall surfaces sufficient to dissipate their energy to a point below which they will not adversely effect the photographic quality of the image recorded thereon, said internal wall surfaces including a plurality of serrated wall surfaces comprising juxtaposed converging wall surfaces for reflecting therebetween certain of such unwanted image-bearing light rays to dissipate their energy.

2. The photographic apparatus of claim 1 wherein said serrated wall surfaces are positioned outside of and in spaced apart relationship to the bundle of extreme rays entering said enclosure structure and defining the limits of said field of view of said photographic apparatus.

3. The photographic apparatus of claim 1 wherein said opaque enclosure structure further includes means for mounting said objective lens assembly in alignment with said outlet aperture during exposure.

4. The photographic apparatus of claim 1 wherein said opaque enclosure structure further includes means for mounting the photosensitive area of the film in alignment with said outlet aperture during exposure.

5. The photographic apparatus of claim 1 wherein the serrations in said serrated wall surfaces extend alongside said field of view of said photographic apparatus in directions extending generally lengthwise of the bundle of extreme rays entering said enclosure structure and defining the limits of said field of view of said photographic apparatus.

6. The photographic apparatus of claim 1 wherein the major portion of said internal wall surfaces are positioned outside of and spaced from the bundle of extreme rays entering said enclosure structure and defining the limits of said field of view of said photographic apparatus and another portion of said wall surfaces extend inwardly from said major portion of said wall surfaces to positions located substantially at the edge of said bundle of extreme rays of said field of view of said photographic apparatus and intermediate said inlet and outlet apertures.

7. The photographic apparatus of claim 6 wherein said major portion of said internal wall surfaces comprises all of said serrated wall surfaces.

8. The photographic apparatus of claim 6 wherein said major portion of said wall surfaces is formed in a section of said opaque enclosure structure consisting of a single injection molded plastic member and at least part of said other portion of said wall surfaces is formed in a section of said opaque enclosure structure consisting of another injection molded opaque plastic member, said injection molded opaque plastic members being further formed with complementary structure serving to effect a snap-fit connection therebetween.

9. The photographic apparatus of claim 1 wherein said outlet aperture is angularly disposed relative to said inlet aperture to provide a compact camera structure and said photographic apparatus additionally includes a substantially non-light absorbing specular reflective mirror for receiving image-bearing light rays within said field of view of said photographic apparatus as they enter said opaque enclosure structure through it said inlet aperture and redirecting such rays incident thereon to the photosensitive area of the film unit.

10. The photographic apparatus of claim 9 wherein said enclosure structure further includes means for mounting said mirror in optical alignment with said objective lens assembly and said outlet aperture.

11. A photographic apparatus comprising:
means for defining an image plane at which a film unit having a photosensitive area of given dimensions may be positioned for exposure;
an objective lens assembly, having a given field in object space, for directing image-bearing light rays from a scene being photographed onto the entire photosensitive area of the film unit is positioned at said image plane, to record an image of the scene thereon, said objective lens assembly and the photosensitive area of the film unit cooperating to define a field of view of said photographic apparatus which is smaller than said field of said objective lens assembly; and
an opaque enclosure structure having an outlet aperture disposed in optical alignment with the film unit's photosensitive area and an inlet aperture disposed in optical communication with said objective lens assembly, said objective lens assembly being configured and arranged with respect to said opaque enclosure structure so that unwanted image-bearing light rays originating within said field of said objective lens assembly but outside said field of view of said photographic apparatus enter said opaque enclosure structure through its said inlet aperture, said enclosure structure comprising internal wall surfaces including a plurality of serrated wall surfaces comprising juxtaposed converging wall surfaces for reflecting therebetween certain of such unwanted image-bearing light rays, the serrations in said serrated wall surfaces extending alongside and generally parallel to the bundles of extreme rays entering said enclosure structure and defining the limits of said field of view of said photographic apparatus and in directions extending generally lengthwise of said bundle of extreme rays defining said field of view of said photographic apparatus.

12. The photographic apparatus of claim 11 wherein said converging wall surfaces converge at an angle on the order of 60°.

13. The photographic apparatus of claim 11 wherein the serrations in said serrated wall surfaces extend at an oblique angle relative to said bundle of extreme rays defining said field of view of said photographic apparatus.

14. An exposure chamber for use in a photographic apparatus including an image plane at which a film unit having a photosensitive area of given dimensions may be positioned for exposure, an objective lens assembly, having a given field in object space, for directing image-bearing light rays onto the entire photosensitive area of the film unit when the film unit is positioned at the image plane to record an image of the scene thereon, the objective lens assembly and the photosensitive area of the film cooperating to define a field of view of the apparatus which is smaller than the field of the objective lens assembly, said exposure chamber comprising:
an opaque enclosure structure having an outlet aperture disposed in optical alignment with the film unit's photosensitive area and an inlet aperture in optical communication with said objective lens assembly, said objective lens assembly being configured and arranged with respect to said opaque enclosure structures so that unwanted image-bearing light rays originating within said field of said objective lens assembly but outside said field of view of said photographic apparatus enter said enclosure structure through its said inlet aperture, said enclosure structure comprising internal light-absorbing specularly reflective wall surfaces including portions located and oriented to initially intercept substantially all such unwanted image-bearing light rays and to redirect initial reflections of substantially all such unwanted image-bearing light rays in predetermined directions so that they either do not impinge upon the photosensitive area of the film unit or only impinge upon the photosensitive area of the film unit after undergoing a plurality of additional reflections from said internal wall surfaces sufficient to dissipate their energy to a point below which they will not adversely affect the photographic quality of the image recorded thereon, said internal wall surfaces including a plurality of serrated wall surfaces comprising juxtaposed converging wall surfaces for reflecting therebetween certain of such unwanted image-bearing light rays to dissipate their energy.

15. The photographic apparatus of claim 14 wherein said serrated wall surfaces are positioned outside of and in spaced apart relationship to the bundle of extreme rays entering said enclosure structure and defining the limits of said field of view of said photographic apparatus.

16. The photographic apparatus of claim 14 wherein the serrations in said serrated wall surfaces extend alongside said field of view of said photographic apparatus in directions extending generally lengthwise of the bundle of extreme rays entering said enclosure structure and defining the limits of said field of view of said photographic apparatus.

17. The photographic apparatus of claim 14 wherein the major portion of said internal wall surfaces are positioned outside of and spaced from the bundle of extreme rays entering said enclosure structure and defining the limits of said field of view of said photographic apparatus and another portion of said wall surfaces extend inwardly from said major portion of said wall surfaces to positions located substantially at the edge of said bundle of extreme rays of said field of view of said photographic apparatus and intermediate said inlet and outlet apertures.

18. The photographic apparatus of claim 14 wherein said outlet aperture is angularly disposed relative to said inlet aperture to provide a compact camera structure and said photographic apparatus additionally includes a substantially non-light absorbing specularly reflective mirror for receiving image-bearing light rays within said field of view of said photographic apparatus as they enter said opaque enclosure structure through its said inlet aperture and redirecting such rays incident thereon to the photosensitive area of the film unit.

19. An exposure chamber, for use in a photographic apparatus, including an image plane at which a film unit having a photosensitive area of given dimensions may be positioned for exposure, an objective lens assembly, having a given field in object space, for directing image-bearing light rays onto the entire photosensitive area of the film unit when the film unit is positioned at the image plane to record an image of the scene thereon, the objective lens assembly and the photosensitive area of the film cooperating to define a field of view of the apparatus which is smaller than the field of the objective lens assembly, said exposure chamber comprising:
an opaque enclosure structure having an outlet aperture disposed in optical alignment with the film unit's photosensitive area and an inlet aperture in optical communication with said objective lens assembly, said objective lens assembly being configured and arranged with respect to said opaque enclosure stuctures so that unwanted image-bearing light rays originating within said field of said objective lens assembly but outside said field of view of said photographic apparatus enter said enclosure structure through its said inlet aperture, said enclosure structure comprising internal light-absorbing specularly reflective wall surfaces including portions located and oriented to initially intercept substantially all such unwanted image-bearing light rays and to redirect initial reflections of substantially all such unwanted image-bearing light rays in predetermined directions so that they either do not impinge upon the photosensitive area of the film unit or only impinge upon the photosensitive area of the film unit after undergoing a plurality of additional reflections from said internal wall surfaces sufficient to dissipate their energy to a point below which they will not adversely affect the photographic quality of the image recorded thereon, said internal wall surfaces having an average surface finish no rougher than ten microinches.

20. The photographic apparatus of claim 9 wherein the major portion of said internal wall surfaces are positioned outside of and spaced from the bundle of extreme rays entering said enclosure structure and defining the limits of said field of view of said photographic apparatus and another portion of said wall surfaces extend inwardly from said major portion of said wall surfaces to positions located substantially at the edge of said bundle of extreme rays of said field of view of said photographic apparatus and intermediate said inlet and outlet apertures.

21. The photographic apparatus of claim 20 wherein said major portion of said wall surfaces is formed in a section of said opaque enclosure structure consisting of a single injection molded plastic member and at least part of said other portion of said wall surfaces is formed in a section of said opaque enclosure structure consisting of another injection molded opaque plastic member, said injection molded opaque plastic members being further formed with complementary structure serving to effect a snap-fitt connection therebetween.

22. The photographic apparatus of claim 19 wherein said wall surfaces comprise a dielectric material.

23. Photographic apparatus comprising:
means for defining an image plane at which a film unit having a photosensitive area of given dimensions may be positioned for exposure;
an objective lens assembly, having a given field in object space, for directing image-bearing light rays from a scene being photographed onto the entire photosensitive area of the film unit when the film unit is positioned at said image plane to record an image of the scene thereon, said objective lens asembly and the photosensitive area of the film cooperating to define a field of view of said photographic apparatus which is smaller than said field of said objective lens assembly; and
an opaque enclosure structure having an outlet aperture disposed in optical alignment with the film unit's photosensitive area and an inlet aperture in optical communication with said objective lens assembly, said objective lens assembly being configured and arranged with respect to said opaque enclosure structure so that unwanted image-bearing light rays originating within said field of said objective lens assembly but outside said field of view of said photographic apparatus enter said enclosure structure through its said inlet aperture, said enclosure structure comprising internal light-absorbing specularly reflective wall surfaces including portions located and oriented to initially intercept all such unwanted image-bearing light rays and to redirect initial reflections of all such unwanted image-bearing light rays in predetermined directions so that they either do not impinge upon the photosensitive area of the film unit or only impinge upon the photosensitive area of the film unit after undergoing a plurality of additional reflections, from said internal wall surfaces, sufficient to dissipate their energy to a point below which they will not adversely effect the photographic quality of the image recorded thereon, said internal wall surfaces including a plurality of serrated wall surfaces comprising juxtaposed converging wall surfaces for reflecting therebetween certain of such unwanted image-bearing light rays, the major portion of said internal wall surfaces being positioned outside of and spaced from the bundle of extreme rays entering said enclosure structure and defining the limits of said field of view of said photographic apparatus and another portion of said wall surfaces extend inwardly from said major portion of said wall surfaces to positions locates substantially at the edge of said bundle of extreme rays of said field of view of said photographic apparatus and intermediate said inlet and outlet apertures, said major portion of said wall surfaces being formed in a section of said opaque enclosure structure consisting of a single injecton molded plastic member and at least part of said other portion of said wall surfaces being formed in a section of said opaque enclosure structure consisting of another injection molded opaque plastic member, said injection molded opaque plastic members being further formed with complementary structure serving to effect a snap-fit connection therebetween.

* * * * *